United States Patent [19]

Kersten et al.

[11] Patent Number: 5,522,307
[45] Date of Patent: Jun. 4, 1996

[54] DEVICE FOR CONTROLLING THE BOILING POWER OF A WATER-CONTAINING VESSEL

[75] Inventors: Reinhard Kersten; Klaus Klinkenberg, both of Aachen, Germany

[73] Assignee: U.S. Philips Corporation, Del.

[21] Appl. No.: 291,216

[22] Filed: Aug. 16, 1994

Related U.S. Application Data

[62] Division of Ser. No. 896,949, Jun. 11, 1992, Pat. No. 5,378,482.

[30] Foreign Application Priority Data

Jun. 26, 1991 [DE] Germany ............... 41 21 038.7
Jul. 6, 1991 [DE] Germany ............... 41 22 430.2

[51] Int. Cl.⁶ .................................................. A21B 1/08
[52] U.S. Cl. .......................... 99/331; 99/410; 99/470; 126/369; 219/401

[58] Field of Search ............... 99/403, 410, 470, 99/474, 331, 325, 472, 337; 126/369, 344; 219/401

[56] References Cited

U.S. PATENT DOCUMENTS

| | | | |
|---|---|---|---|
| 4,856,422 | 8/1989 | Meister | 99/337 |
| 4,982,655 | 1/1991 | Wen-Der et al. | 99/337 |
| 5,178,125 | 1/1993 | Kuen | 126/369 |
| 5,301,652 | 4/1994 | Willis et al. | 126/369 |

Primary Examiner—David Scherbel
Assistant Examiner—Reginald L. Alexander
Attorney, Agent, or Firm—Ernestine C. Bartlett

[57] ABSTRACT

The invention provides a method of controlling the boiling power for a water-containing vessel (10) which can be heated by a cook-top (11), for example a light cook-top, the amount of water evaporating at atmospheric pressure being sufficient to maintain an air-steam interface such that any residual air is expelled from the vessel (10) by an automatically controlled supply of heating power (12).

21 Claims, 3 Drawing Sheets

DEVICE FOR CONTROLLING THE BOILING POWER OF A WATER-CONTAINING VESSEL

This is a division of application Ser. No. 07/896,949, filed Jun. 11, 1992, now U.S. Pat. No. 5,378,482.

The invention relates to a method of controlling the boiling power for a water-containing vessel which can be heated by a cook-top, for example a light cook-top, and to a device for carrying out this method.

BACKGROUND OF THE INVENTION

The correct setting of the boiling power for cooking (potatoes, noodles, vegetables, eggs and, if desired, also meat) requires constant supervision by the user. In most cases the heating power is then increased or reduced by hand in the usual manner, depending on whether the substance to be cooked simmers. In order to guarantee steady boiling the power is then often set to a value larger than the power actually required for the process. This means an increased power consumption, an increased steam production, more cooking odors, and sometimes spoiling of the food being cooked.

DE-GM 81 31 827 discloses a device for the heat treatment of foodstuffs, in particular for the preparation of meals, by means of a steam-air mixture as a heat-transfer medium. A motor-driven fan then circulates the steam-air mixture at atmospheric pressure in a cooking space which can be closed by means of a door. The cooking space is provided with a controllable moisture exhaust and with a condensate outlet. Moreover, there is provided a heating device for the heat-transfer medium and a special steam generator with a temperature-controlled heating element. An associated temperature controller comprises a sensor arranged in a connection from the cooking space to the surrounding air, through which the steam-air mixture can emerge only after overcoming its net lift. In the known construction the sensor is situated inside a tube underneath the bottom plate of the cooking space. The tube serves for discharging the condensate and as a measurement-sensor tube. The known device has a special steam generator for the delivery of steam to the separate cooking space. The amount of steam to be generated and to be introduced in a uniformly distributed manner should be only so much as needed for the acceleration of the defrosting or cooking process by the transfer of condensation heat to the foodstuffs and meals. Excess steam will be discharged uselessly into the surrounding air.

In such devices steam is introduced into the cooking space and mixes with the air present in the cooking space, thereby partly supplanting this air. The heat of the steam is then transferred to the substance to be cooked, the steam component condensing and being discharged via the discharge tube. Depending on the amount of steam utilized in this process the steam supply is then controlled or regulated with the aid of the sensor depending on the required replenishment. Controlling is effected in that the steam leaves the cooking compartment via the connection tube and is detected by the sensor. When a specific temperature is reached the supply of steam is discontinued but the steam still present in the cooking chamber still gives up heat and condenses. The substantial change in volume during the transition from steam into condensate lowers the pressure in the cooking space, so that cold ambient air is taken in through the measurement-sensor tube. The temperature difference then occuring at the measurement sensor is then used for changing or restoring the steam supply. After a certain predetermined switching temperature has been reached cooling again results in the steam supply being re-connected.

EP-PS 0,171,522 describes a similar device in which the tube is arranged on a side wall or upper wall of the cooking space. In this case the sensor is a device detecting the pressure or the flow rate of the medium flowing through the tube.

The said known constructions have a condensate outlet which constantly discharges condensate, also during the controlled cooking process.

SUMMARY OF THE INVENTION

An object of the invention is to improve a method of the type defined in the opening paragraph for controlling the boiling power for a water-containing vessel which can be heated by a cook-top in such a way that the boiling power required for the cooking process can be determined and controlled reliably and automatically in a simple manner.

According to the invention this object is achieved in that a method is provided in which by an automatically controlled supply of heating power, the amount of water evaporating at atmospheric pressure is exactly such that any residual air is expelled from the vessel. Thus, it is accomplished that the excellent heat-transfer properties of a so-called "heat pipe" occur throughout the vessel. As is known, this situation is already obtained in the case of vented steam-pressure cookers. In contradistinction to the steam-pressure cooker which operates at an increased pressure, the invention relates to cooking at, i.e. not above, atmospheric pressure. Any application of energy in excess of the ideal situation of a pure water-vapor atmosphere merely causes the external steam production to increase but in no way contributes to an improved cooking process. This ideal situation is attainable by means of the method in accordance with the invention. After venting has ceased no water or condensate is discharged through the measurement tube. Except for the air-steam mixture discharged during venting, no condensate is discharged with the construction in accordance with the invention during steady operation.

In a preferred embodiment of the method in accordance with the invention the method is characterized in that (a) the vessel (10), which communicates with the ambient air only via measurement tube (16), is heated until the air has been expelled from the vessel (10) and at least an adjoining part of the measurement tube (16), (b) a steam-air interface between steam (23) and air is formed in the measurement tube (16) and is detected by means of temperature sensor (18), and (c) the location of said interface is maintained constant within a measurement area of the temperature sensor (18) by a heating-power control process initiated by the temperature sensor (18). The temperature sensor utilizes the substantial difference in heat transfer capacity between pure air and pure water vapor. Whereas pure air has a thermal conductivity of less than 0.1 W/m° K., pure water vapor in a so-called heat pipe can reach an effective thermal conductivity of more than 1000 W/m° K. This is based on the fact that the steam molecules with their high thermal capacity can shoot freely to the condensation surface and are not impeded by the reflux of condensed water.

Incomplete venting of the vessel can be detected always in the case that the temperature fluctuations per unit of time near the setpoint temperature of the temperature sensor are small. In addition to the automatic cooking process for heating up and boiling, the invention also provides a simple check of the venting function. With the construction in accordance with the invention the condensate produced in the measurement tube flows back completely into the vessel, so that dry-boiling is impossible even in the case of very small quantities of water. The invention enables an energy-saving cooking process to be obtained because a minimal amount of water (rapid heating) is possible and the waste steam rate is extremely small (less than 5 g/h, minimum heating power). Moreover, cooking is substantially odorless as a result of the small waste steam rate. Cooking in pure steam at 100° C. spares the food due to the exclusion of oxygen and precludes mechanical defects as a result of bubbling or excess pressure upon opening. The method functions between Dead Sea and Montblanc altitudes because control is based on the steam-air interface and not on a fixed temperature.

Since cooking is effected at atmospheric pressure a light construction is possible for the vessel. The invention can also be used with glass vessels, preferably in the case of cooking by means of light. During the cooking process the lid of the vessel can be removed without any adverse effect for the purpose of examination or adding a further substance to be cooked with a shorter cooking time. After having detected that air has been admitted, the system automatically restores the previous situation, for example by initiating the application of the full power. The automatic control allows both for different fixed heat losses (for example different vessel sizes and areas) and dynamic changes (for example the diminishing power extracted in the process of boiling potatoes).

The control method in accordance with the invention is a proportional control method, for example by means of a PID controller. As soon as the air has been removed from the vessel and at least an adjoining part of the measurement tube upon the application of power, a temperature, referred to as the setpoint temperature to be maintained by controlling, is established in the measurement area of the temperature sensor. In the case of small deviations from the setpoint temperature, correction is effected at low power levels and, in the case of large deviations from the setpoint temperature, is effected at high power levels.

Good results can be obtained in that in the range of the setpoint temperature (for example ±5° K., i.e. between 80° and 90° C.) the loop gain is constantly low and increases linearly outside this range.

An advantageous embodiment of the method in accordance with the invention is characterized in that initially the vessel (10) is heated by a cook-top (11), initially the full power is applied for low-temperature signals of below 40° C., after which for mid-temperature signals of 40°–85° C. the power is continuously reduced to zero, and subsequently in a proportional control process the heating power is controlled in dependence upon the steam-air interface which fluctuates in the measurement area of the temperature sensor. Initially the full power is applied during heating with such a method, so that the water very rapidly reaches the boiling temperature of 100° C. If the temperature signals then increase and have reached an average level of approximately 40°, the power is reduced continuously and is turned off when the setpoint temperature of the temperature sensor is reached. When the setpoint temperature is reached, this ensures that the residual air has been expelled completely from the vessel and from the adjoining part of the measurement tube. Subsequently, the actual control by means of a proportional control process begins, the heating power being controlled in dependence upon the fluctuating interface between the hot steam expelled from the vessel and the ambient air drawn into the measurement tube during a cooling phase in the measurement area of the temperature sensor.

The control circuit and the control parameters are configured in such a way that during the control process the fluctuating interface between the steam expelled from the vessel into the measurement tube and the air drawn into the measurement tube in the measurement area of the sensor is situated inside the measurement tube. This guarantees that no steam emerges from the measurement tube during steady operation. This means an extremely small loss of water.

In a further embodiment of the invention the power supply may be cut off completely for large signals above the setpoint temperature.

It may happen that the sensor temperature is very close to the setpoint temperature (below the maximum temperature) although the air has not been removed completely from the vessel. This is the case, for example, when during the cooking process the vessel is opened only briefly without the addition of further substances to be cooked. The control system then has no reason to expel the air-steam mixture by increasing the power and to proceed rapidly to the normal control mode. In this case the temperature curve of the sensor is very smooth whereas in a normal control mode the temperature curve fluctuates heavily about the setpoint, viz. by ±5° K. Therefore, in accordance with the invention, the presence of a substantially uniform temperature fluctuation at the temperature sensor (18) caused by the heating power control process that is initiated by the temperature sensor, is used as a measure of the air content of the vessel (10). In accordance with a further embodiment such a disturbance can be detected in that there is provided a second temperature sensor arranged nearer the tube outlet.

A device for carrying out the method in accordance with the invention is preferably characterized in that (a) the interior of the vessel (10) only communicates with the ambient air via the measurement tube (16) which serves as the measurement path, (b) in an area above the water surface the measurement tube (16) is coupled to said vessel in such a way that condensate formed in the tube (16) flows back into the vessel (10) by gravity, and (c) the temperature sensor (18) is connected to a control device (20) for influencing the heating power (12).

The opening of the measurement tube to the surrounding air always constitutes the highest point of the tube in order to ensure that the condensate in the tube returns into the vessel. One or two low-capacitance temperature sensors are arranged on or in the measurement tube, which sensors are externally coupled with the ambient air and which influence the heating power by means of a control device. This enables a robust and simple construction without movable parts to be obtained. The temperature sensors can be simple standard temperature sensors. Suitably, the measurement tube is inclined to allow the condensate to flow back to the low end and to keep the measurement sensors at the opposite end substantially free from condensate.

Further suitable embodiments of the invention, further advantages, and a detailed functional explanation are given in the following description with reference to the drawings.

BRIEF DESCRIPTION OF THE DRAWINGS

In the drawings

FIG. 1 is a basic diagram of a device in accordance with the invention,

FIG. 2 shows an associated measurement diagram, and

FIG. 3 shows a further measurement diagram for two measurement sensors.

DETAILED DESCRIPTION OF THE PREFERRED EMBODIMENTS

Figure 1:
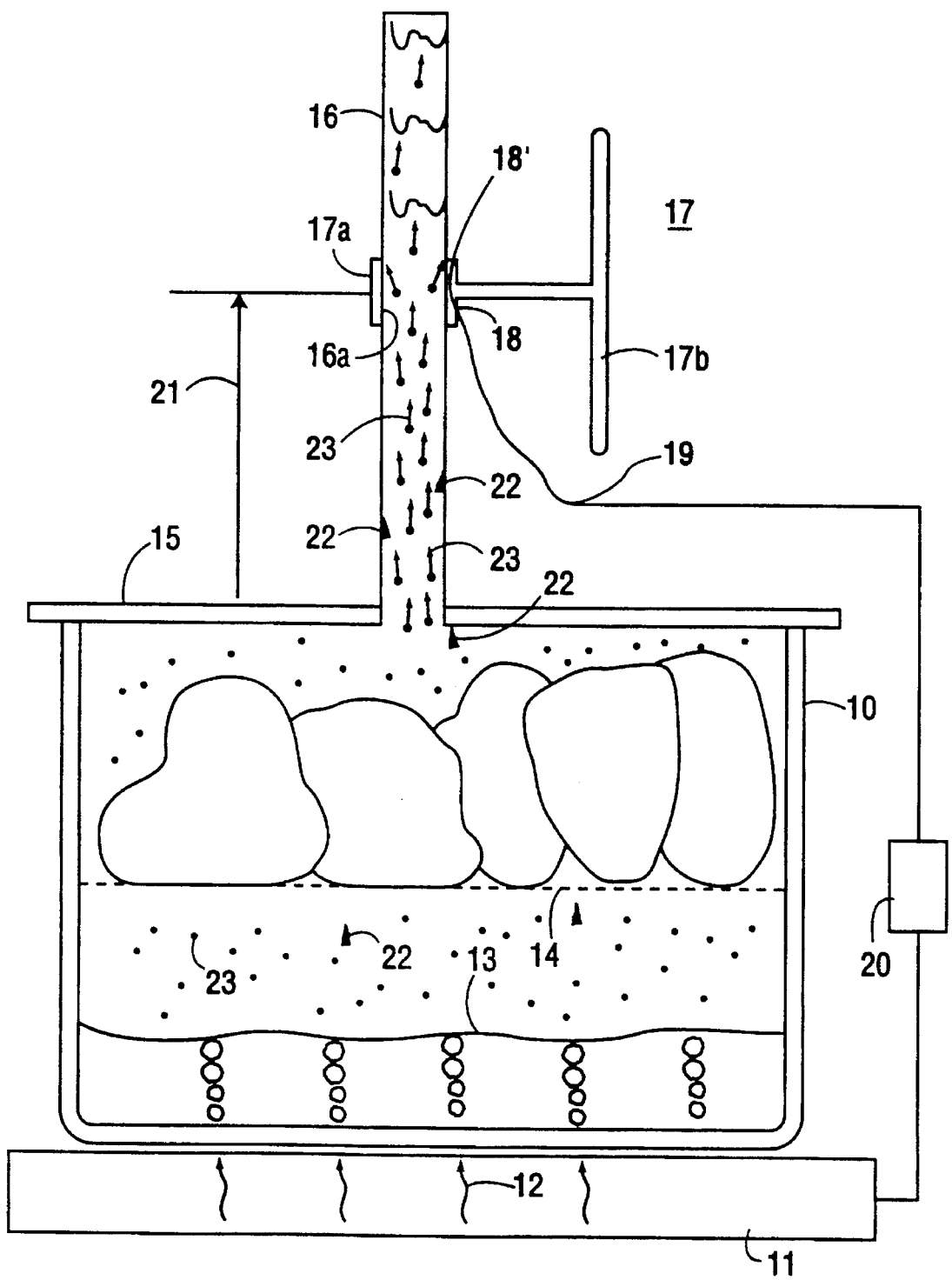
FIGS. 1 to 3 show diagrammatically an embodiment of the invention.

In FIG. 1, a cooking vessel 10 is placed on a cook-top 11 and is heated by means of a power-supply element 12. The cooking vessel is filled with water up to a level 13 and in its upper part it comprises a grid 14 on which the substance to be cooked (potatoes) is situated. The cooking vessel 10 is closed by means of a lid 15 provided with an upwardly directed measurement tube 16. The interior of the vessel communicates with the surrounding air only via the tube 16. A cooler 17 is coupled to the measurement tube in the area 16a and has a small surface 17a in fixed contact with the measurement tube 16a and a large cooling surface 17b in contact with the ambient air. Moreover, a temperature sensor 18 is arranged at the coupling location and is connected to a diagrammatically shown control device 20 for controlling the power applied to the cook-top 11. The cooler 17 is arranged at a distance 21 above the lid 15 and together with the temperature sensor 18 and the part 16a of the measurement tube 16 it constitutes a heat extraction device with heat flux measurement. The temperature sensor 18 is arranged at the measurement area 18' where the heat flux flows from the inner condensation surface at the location of the tube 16a to the cooling surface 17b. Hereinafter the condensed water drops are referenced 22 and the steam present in the space above the water surface 13 and in the tube 16 is referenced 23.

In order to explain the measurement principle two extreme cases are described hereinafter:

1. During intensive boiling the inner surface of the tube 16 is held at a temperature of 100° C. by condensation 22, the influence of the heat absorption on this temperature being only small owing to the low heat resistance of the system "pure steam 23+condensate 22". Depending on the heat resistances (inner wall of the tube 16–measurement area 18") and (measurement area 18'–cooling surface 17b), a temperature <100° C. (in the present example approximately 85° C.) is established at the measurement area 18'. This temperature is influenced only by the range of fluctuation of the ambient temperature (approximately 15° C. to 30° C.), which influence decreases as the coupling between the measurement area 18' and the inner wall of the tube 16 is more effective.

2. When the water is not boiling not much steam 23 enters the tube 16 from below and the interior of the tube 16 contains air with poor heat-transfer properties. As a result of this, the temperature of the measurement area 18' is reduced substantially by the heat absorption.

Situations between these two extreme cases will be described hereinafter. When the power is still adequate to sustain boiling, steam 23 will continually enter from the vessel 10 into the measurement tube 16 and will expel the air at the tube entrance. With a small boiling power this steam will condense largely inside the measurement tube 16, so that no steam will leave the measurement tube in normal operation. The air content increases steadily in an upward direction and therefore the heat transfer capacity deteriorates in the upward direction. In the case of heat abstraction at the measurement tube 16 at the location of the cooler 17, the temperature at the measurement tube will continually decrease in the upward direction in accordance with the increased air content. For the temperature sensor 18 a low temperature of, for example, <60° C. therefore means that the measurement tube 16 or even the upper part of the vessel 10 is filled with air, i.e. the boiling condition is not reached. In the range between for example 60° C. and 85° C. the steam-air interface is situated inside the measurement tube 16 and is situated further upwards as the measurement temperature increases. When the maximum value of, for example, 85° C. is reached the interface betwen steam and air is situated definitely above the measurement area, i.e. all the air has been expelled from the entire measurement tube. This means violent boiling.

The selected arrangement enables the temperature to be measured by means of a single temperature sensor 18. This is more advantageous than a measurement by means of a heat-flux meter, for example a thermopile. Alternatively, the temperature sensor 18 may be arranged inside the measurement tube 16. However, this poses cleaning problems. Moreover, the measurement tube 16, shown diagrammatically in FIG. 1, with the associated temperature sensor 18, may be arranged inside a suitably constructed handle.

Since the heat transfer in the vapor phase should not be influenced to any significant extent by the thermal conduction in the solid material, the measurement tube, in an embodiment of the invention, has a low thermal conduction in the solid material in a longitudinal direction.

For a short response time of the temperature sensor 18 when boiling lapses and the measurement tube fills with air, a rapid cooling of the temperature measurement area is desirable. Therefore, the thermal capacity of the device is kept low in an embodiment of the invention.

For example, for the measurement tube 16 a thin-walled high-grade steel tube is very suitable in order to meet the two above requirements but the use of a plastics tube may also be considered.

Too small a diameter of the measurement tube 16 results in too small a cross-section for the reflux of the condensate 22 and makes the tube susceptible to contamination. Too large a diameter leads to convective mixing at the steam-air interface, i.e. to increased indeterminancy of the measurement signal detected by means of the temperature sensor. Therefore, in a further embodiment of the invention the diameter of the measurement tube 16 is selected so as to ensure a reliable reflux of the condensate 22 and to inhibit convective mixing at the steam-air interface. Tests have demonstrated that a diameter of approximately 8 mm to 12 mm is advantageous.

Figure 2:
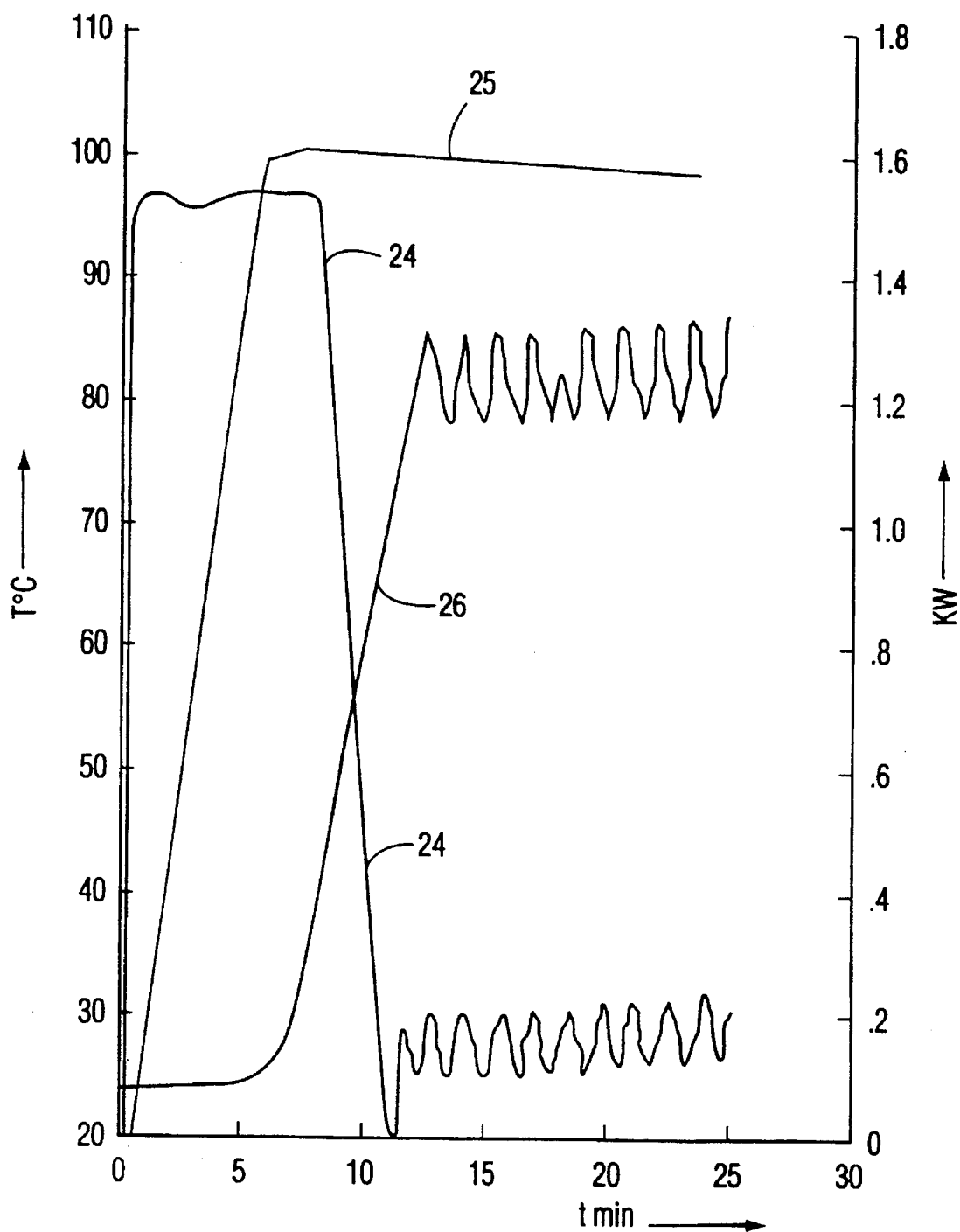

FIG. 2 shows diagrammatically the measurement results of a process for the automatic heating and boiling of a substance to be cooked by means of a device as shown in FIG. 1. The power 24, the water temperature 25 and the temperature 26 of the measurement area 18' which is spaced at a distance 21 from the lid 15 are plotted as functions of time. The temperature signal measured by the temperature sensor 18 at this measurement area is referenced 26. This temperature signal influences the cook-top 11 as follows in a proportional control process:

For temperatures below 40° C. the full power was applied. For temperatures in the range between 40° C. and 85° C. the power was reduced to 0 W, followed by the actual control process until the end of the cooking process. The cook-top 11 remained off for temperatures >85° C.

As is shown by the diagram the temperature sensor 18 responds rather late to the incipient boiling process. This is a sign of the minimal response to the already warm air-steam mixture which emerges. The power 24 is reduced without any significant transient effects. Steam emerges only in very small amounts. For a one-hour cooking process controlled loss rates of only approximately 5 g to 10 g of water per hour were measured. The test results show that with these steam-discharge rates the air has been expelled completely from the vessel because both the food in the water and that underneath the lid 15 were found to have substantially the same state of readiness.

Preferably, the maximum heating power is determined for an automatic cooking process to preclude burning in the case of sensitive substances, for example milk. This maximum power is then also valid for the subsequent control range of the boiling process, for example after the lid 15 has been opened.

Figure 3:
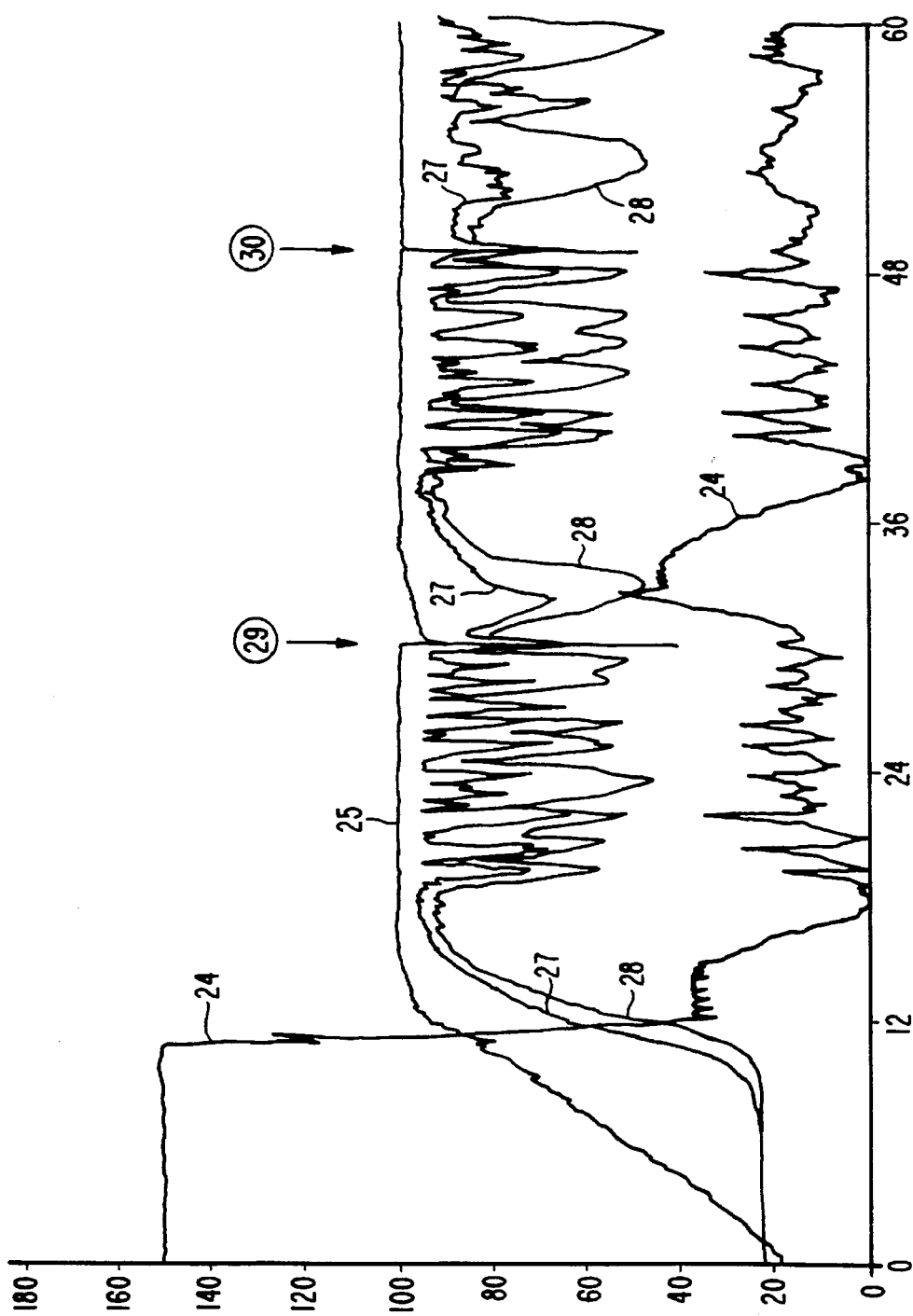

FIG. 3 is a measurement diagram with an additional temperature sensor nearer the tube outlet. The temperature of the first sensor is referenced 27 and that of the second sensor is referenced 28. The second temperature sensor is arranged between the first sensor and the tube outlet.

In the range 29 additional items to be cooked are introduced. The curve 25 falls and the two temperature curves 27, 28 fall substantially concurrently. Thus, the subsequent load is handled without any problems and a suitable correction is applied (see the curve 27).

In the range 30 air is admitted briefly (lid open). Initially both temperature curves remain parallel and subsequently they become dissimilar. Thus, the air-content condition can be detected from this typical curve shape. Thus, the disturbance can be corrected by the control system (both temperatures varying similarly near the setpoint).

We claim:

1. A device for determining and controlling boiling in a water-containing vessel (10) heated by an element having a heating means (12) by which power is applied to heat the water-containing vessel, wherein food placed inside the vessel is subjected to the action of steam or water vapor generated during heating of the water-containing vessel, said device comprising a heat extraction device with heat flux measurement operatively associated with said water-containing vessel and comprising a measurement tube (16), a cooler (17) coupled to the measurement tube at a coupling location, and a temperature sensor (18) arranged at the coupling location and connected to the control device (20) for controlling the power applied to heat the water-containing vessel, which measurement tube, cooler, temperature sensor and control device cooperate to automatically control the heating means (12) based on measurements from the heat extraction device to evaporate water and to expel residual air from the vessel by heating with such automatically controlled heating means (12).

2. A device as claimed in claim 1 wherein (a) the interior of the vessel (10) only communicates with the ambient air via the measurement tube (16) which serves as the measurement path, (b) in an area above the water surface the measurement tube (16) is coupled to said vessel in such a way that condensate formed in the tube (16) flows back into the vessel (10) by gravity, and (c) the temperature sensor (18) is connected to a control device (20) for influencing the heating means (12).

3. A device as claimed in claim 1, wherein the measurement tube, cooler, temperature sensor and control device cooperate to automatically control the heating means (12) to evaporate water and to expel residual air from the vessel by heating with such automatically controlled heating means (12) so that the amount of water evaporating at atmospheric pressure is that amount that is sufficient to maintain a steam-air interface such that residual air is expelled from the vessel (10) and, after such residual air is expelled, no substantial amounts of water and/or condensate are discharged during subsequent heating of the vessel.

4. A device as claimed in claim 1, wherein the temperature sensor (18) is arranged inside the measurement tube (16).

5. A device as claimed in claim 1, wherein the temperature sensor (18) is arranged outside the measurement tube (16) so as to have an external coupling with the ambient air.

6. A device as claimed in claim 2, wherein a second temperature sensor is arranged nearer the tube outlet.

7. A device as claimed in claim 1, wherein a second temperature sensor is arranged nearer the tube outlet.

8. A device as claimed in claim 7, wherein the measurement tube (16) is arranged in an inclined position and the sensors (18) are arranged at the end which is remote from a condensate reflux area of the tube.

9. A device as claimed in claim 4, wherein the measurement tube (16) is arranged in an inclined position and the sensors (18) are arranged at the end which is remote from a condensate reflux area of the tube.

10. A device as claimed in claim 5, wherein the measurement tube (16) is arranged in an inclined position and the sensors (18) are arranged at the end which is remote from a condensate reflux area of the tube.

11. A device as claimed in claim 1, characterized by a low thermal conduction along solid material in the measurement tube (16) and a minimal thermal capacity.

12. A device as claimed in claim 4, characterized by a low thermal conduction along solid material in the measurement tube (16) and a minimal thermal capacity.

13. A device as claimed in claim 5, characterized by a low thermal conduction along solid material in the measurement tube (16) and a minimal thermal capacity.

14. A device as claimed in claim 6, characterized by a low thermal conduction along solid material in the measurement tube (16) and a minimal thermal capacity.

15. A device as claimed in claim 7, characterized by a low thermal conduction along solid material in the measurement tube (16) and a minimal thermal capacity.

16. A device as claimed in claim 2, wherein the measurement tube (16) is a thin-walled high-grade-steel tube.

17. A device as claimed in claim 2, wherein the measurement tube (16) is made of a plastic material.

18. A device as claimed in claim 2, wherein the diameter of the measurement tube (16) is selected so as to ensure a reflux of the condensate (22) and to inhibit convective mixing at the steam-air interface.

19. A device as claimed in claim 2, wherein the measurement tube (16) is arranged on a lid (15).

20. A device as claimed in claim 2, wherein the measurement tube (16) is arranged on the upper edge of the vessel (10).

21. A device, for controlling the boiling in a heated water-containing vessel heated by an element having a heating means, comprising a heat extraction device with heat flux measurement comprising a measurement tube, a cooler coupled to the measurement tube at a coupling location, and a temperature sensor arranged at the coupling location and connected to a control device for controlling the power applied to heat the water-containing vessel, which measurement tube, cooler, temperature sensor and control device cooperate to automatically control the heating means based on measurements from the heat extraction device to evaporate water and to expel residual air from the vessel, the amount of water evaporating at atmospheric pressure being sufficient to maintain a steam-air interface such that any residual air is expelled from the vessel and, after such residual air is expelled, no substantial amounts of water and/or condensate are discharged during subsequent heating of the vessel;

wherein:

the vessel communicates with the ambient air only via the measurement tube and is heated until the air has been expelled from the vessel and at least an adjoining part of the measurement tube;

the temperature sensor cooperates to detect said steam-air interface and to control the heating means in dependence upon the steam-air interface which fluctuates in the measurement area of the temperature sensor, said device using the presence of a substantially uniform temperature fluctuation at the temperature sensor as a measure of the air content and expulsion of residual air from the vessel.

* * * * *